United States Patent
Deng

(10) Patent No.: US 10,231,173 B2
(45) Date of Patent: Mar. 12, 2019

(54) METHOD FOR ACCESSING CELLS, AND BASE STATION

(71) Applicant: SPREADTRUM COMMUNICATIONS (SHANGHAI) CO., LTD., Zhangjiang, Shanghai (CN)

(72) Inventor: Yun Deng, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 46 days.

(21) Appl. No.: 15/392,331

(22) Filed: Dec. 28, 2016

(65) Prior Publication Data
US 2017/0202050 A1    Jul. 13, 2017

(30) Foreign Application Priority Data

Jan. 12, 2016   (CN) .......................... 2016 1 0018109

(51) Int. Cl.
*H04W 48/16*  (2009.01)
*H04W 76/18*  (2018.01)
(Continued)

(52) U.S. Cl.
CPC ........... *H04W 48/16* (2013.01); *H04W 72/04* (2013.01); *H04W 76/18* (2018.02); *H04W 76/19* (2018.02);
(Continued)

(58) Field of Classification Search
CPC ..... H04W 48/12; H04W 48/16; H04W 48/20; H04W 72/04; H04W 76/18; H04W 72/19; H04W 76/27
See application file for complete search history.

(56) References Cited

U.S. PATENT DOCUMENTS

2013/0039287 A1    2/2013   Rayavarapu et al.
2013/0260740 A1*  10/2013   Rayavarapu ........ H04W 76/046
                                                         455/422.1
(Continued)

FOREIGN PATENT DOCUMENTS

CN    102143598 A    8/2011
CN    102204338 A    9/2011
(Continued)

OTHER PUBLICATIONS

Ericsson & Alcatel Lucent, Solution x: <User plan based solution with AS information stored in RAN >, S2-153635, <SA WG2 Meeting #111>.
(Continued)

*Primary Examiner* — Benjamin H Elliott, IV
(74) *Attorney, Agent, or Firm* — Cantor Colburn LLP

(57) ABSTRACT

Method for accessing cell and base station are provided. The method includes: transmitting system information indicating whether the cell supports connection resume function to a UE; after receiving an RRC connection resume request from the UE, acquiring a resume identification of the UE from the RRC connection resume request; looking up context information of the UE based on the resume identification, and transmitting an RRC connection resume acknowledgement message to the UE after finding the context information; after determining an MME supports connection resume function, transmitting a context information activation request including identification information of the UE to the MME; receiving a context information activation acknowledgement message from the MME, which is transmitted after the MME finds the context information of the UE according to the identification information; and transmitting a notification message indicating that a bearer is resumed to the UE. Failure in connection resume procedure is avoided.

11 Claims, 2 Drawing Sheets

(51) Int. Cl.
*H04W 72/04* (2009.01)
*H04W 76/19* (2018.01)
*H04W 48/12* (2009.01)
*H04W 48/20* (2009.01)
*H04W 76/27* (2018.01)

(52) U.S. Cl.
CPC ............ *H04W 48/12* (2013.01); *H04W 48/20* (2013.01); *H04W 76/27* (2018.02)

(56) References Cited

U.S. PATENT DOCUMENTS

| | | | |
|---|---|---|---|
| 2013/0260810 A1* | 10/2013 | Rayavarapu | H04W 76/19 |
| | | | 455/509 |
| 2013/0260811 A1* | 10/2013 | Rayavarapu | H04W 76/19 |
| | | | 455/509 |
| 2015/0103664 A1* | 4/2015 | Shan | H04W 24/10 |
| | | | 370/235 |
| 2016/0249259 A1* | 8/2016 | Park | H04W 36/00 |
| 2017/0034756 A1* | 2/2017 | Faccin | H04W 16/14 |
| 2017/0202050 A1* | 7/2017 | Deng | H04W 76/18 |

FOREIGN PATENT DOCUMENTS

| | | |
|---|---|---|
| CN | 103858513 A | 6/2014 |
| WO | 2013023975 A1 | 2/2013 |

OTHER PUBLICATIONS

Summary of the SIPO First Office Action corresponding to Application No. 201610018109.7; dated Apr. 28, 2018.

\* cited by examiner

METHOD FOR ACCESSING CELLS, AND BASE STATION

CROSS-REFERENCE TO RELATED APPLICATIONS

The present application claims priority to Chinese patent application No. 201610018109.7, filed on Jan. 12, 2016, and entitled "METHOD FOR ACCESSING CELL AND BASE STATION", and the entire disclosure of which is incorporated herein by reference.

TECHNICAL FIELD

The present disclosure generally relates to wireless communication field, and more particularly, to a method for accessing a cell, and a base station.

BACKGROUND

In a Long-Term Evolution (LTE) system, when a User Equipment (UE) is connected in, a base station allocates necessary parameters for the UE, such as security algorithm, configuration parameters for a medium access control layer (Layer 2), configuration parameters for a physical layer (Layer 1), and configuration parameters for a radio link control layer (Layer 3), for example, radio link failure parameters. Regarding an established bearer, the base station should be aware of information about a channel between the bearer and a core network (i.e., a GTP tunnel). All the parameters mentioned above are called UE context information.

In 3GPP Release 13, for some low-cost UE, established services are generally services with time delay tolerant. To reduce signaling overhead for accessing a network, a Radio Resource Control (RRC) suspend or resume mechanism is introduced. In this mechanism, a UE when turning from a connected state to an idle state should save context information configured for accessing a network currently, a base station saves the context information of the UE which includes configuration parameters for an access layer of the UE, and further Mobility Management Entity (MME) in a core network also saves the context information of the UE which includes configuration parameters for a non-access layer of the UE, GTP tunnel and so on.

When the UE is indicated to enter the idle state, the base station sends a certain identification to the UE, called Resume ID. When the UE is accessed to the network again, the UE initiates a connection resume procedure to indicate its Resume ID to the base station. The base station identifies the UE according to the Resume ID, and resumes a service tunnel (including GTP tunnel at interface S1 and data radio bearer at a corresponding air interface) established for the UE formerly using the saved context information of the UE. In this way, the UE can perform data transmission through the service tunnel again. In the above procedure, there is no need to configure radio resources repeatedly, which greatly reduces signaling overhead.

However, the UE cannot determine whether the selected base station supports the resume procedure, thus, the existing resume mechanism may cause failure in the connection resume procedure.

SUMMARY

In embodiments of the present disclosure, failure in a connection resume procedure may be avoided.

In an embodiment of the present disclosure, a method for accessing a cell is provided, including: transmitting system information to a UE, wherein the system information includes information indicating whether the cell supports a connection resume function; after receiving an RRC connection resume request from the UE, acquiring a resume identification of the UE from the RRC connection resume request; looking up context information of the UE based on the resume identification, and transmitting an RRC connection resume acknowledgement message to the UE after the context information is found; after determining that an MME supports the connection resume function, transmitting a context information activation request to the MME, wherein the context information activation request includes identification information of the UE; receiving a context information activation acknowledgement message from the MME, wherein the context information activation acknowledgement message is transmitted after the MME finds the context information of the UE according to the identification information of the UE; and transmitting a notification message to the UE, wherein the notification message includes information indicating that a bearer is resumed.

Optionally, determining the MME to support the connection resume function may include: determining that a message which includes information indicating that the MME supports the connection resume function is received from the MME.

Optionally, the message which includes information indicating that the MME supports the connection resume function may be one of the following messages: S interface setup response message; an MME configuration update message; and a deactivation acknowledgement message fed back by the MME, wherein the deactivation acknowledgement message is generated after the MME receives a deactivation message.

Optionally, the system information may include an indication information element which is used for indicating whether the cell supports the connection resume function.

Optionally, the indication information element may be set in a system information block 1.

Optionally, there may be a plurality of indication information elements which correspond to different Public Land Mobile Network (PLMN) identifications, respectively.

Optionally, when the UE which has saved the resume identification performs cell reselection, if a plurality of cells are detected to have maximum signal strength values at different frequencies and meet a cell reselection criterion, a cell selected by the UE preferentially is the cell supporting the connection resume function.

In an embodiment of the present disclosure, a based station is provided, including: a first transmitting unit, configured to transmit system information to a UE, wherein the system information includes information indicating whether the cell supports a connection resume function; an acquiring unit, configured to acquire a resume identification of the UE from an RRC connection resume received from the UE; a looking up unit, configured to look up context information of the UE based on the resume identification; a second transmitting unit, configured to transmit an RRC connection resume acknowledgement message to the UE after the context information is found by the looking up unit; a determining unit, configured to determine that an MME supports the connection resume function; a third transmitting unit, configured to transmit a context information activation request to the MME, wherein the context information activation request includes identification information of the UE; a receiving unit, configured to receive a context information activation acknowledgement message from the MME, wherein the context information activation acknowledgement message is transmitted after the MME finds the context information of the UE according to the identification information of the UE; and a fourth transmitting unit, configured to transmit a notification message to the UE, wherein the notification message includes information indicating that a bearer is resumed.

Optionally, the determining unit may be configured to determine that a message which includes information indicating that the MME supports the connection resume function is received from the MME.

Optionally, the message which includes information indicating that the MME supports the connection resume function may be one of the following messages: S1 interface setup response message; an MME configuration update message; and a deactivation acknowledgement message fed back by the MME, wherein the deactivation acknowledgement message is generated after the MME receives a deactivation message.

Embodiments of the present disclosure may provide following advantages. The base station informs the UE which cells support the connection resume function through the system information, and determines whether the MME supports the connection resume function. The UE starts to perform the connection resume procedure after knowing that the cell supports the connection resume function. The base station transmits the context information activation request to the MME to inform the MME to activate the saved context information, after making sure that the MME supports the connection resume function. Therefore, the UE initiates the connection resume procedure at the cell supporting the connection resume procedure, and the base station transmits the context information activation request to the MME supporting the connection resume function, which may avoid failure in the connection resume procedure.

Further, the indication information element which is used for indicating whether the cell supports the connection resume function is set in the system information block 1. The UE only needs to read the system information block 1 to know whether the cell supports the connection resume function. Namely, there is no need to read other system information blocks in the cell, which may reduce the number of system information blocks to be read by the UE and further reduce power consumption of the UE.

DETAILED DESCRIPTION

Figure 1:
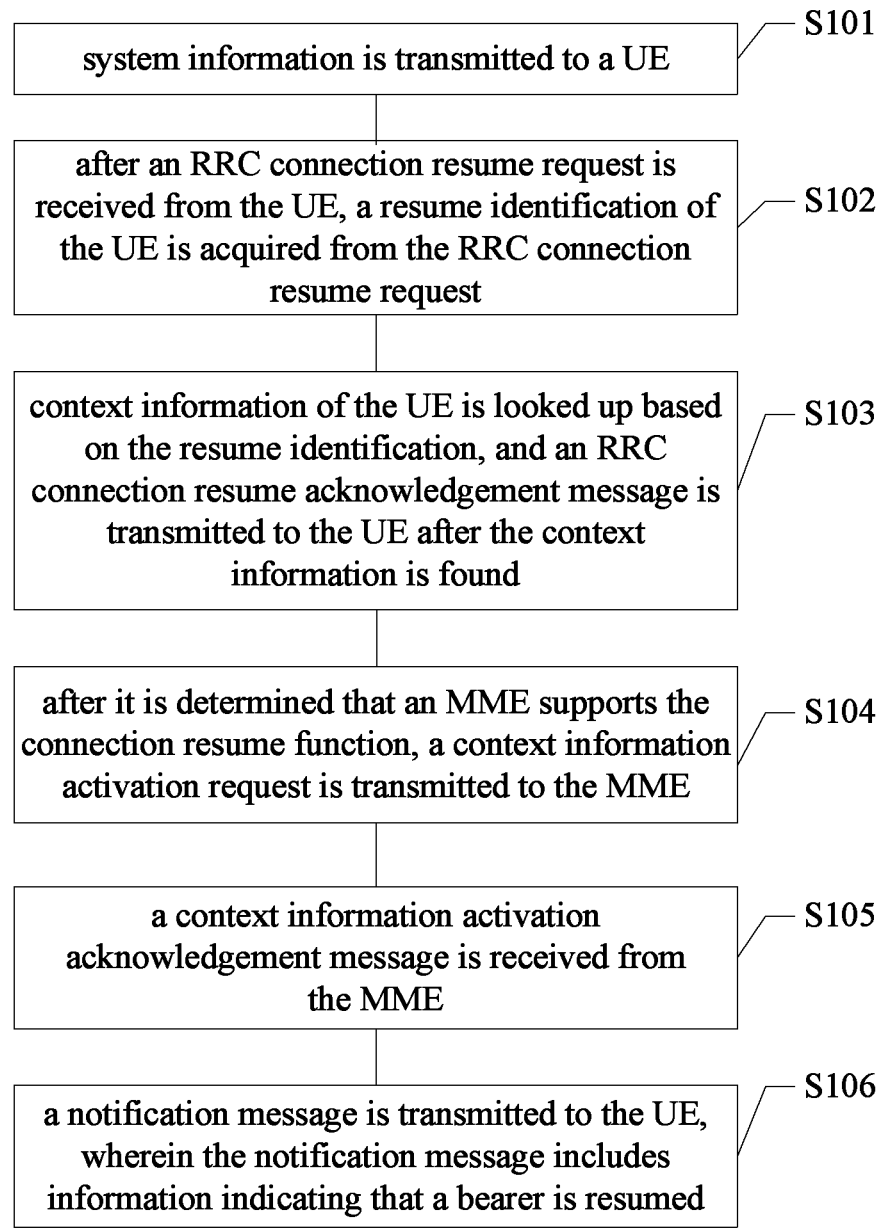
FIG. 1 schematically illustrates a flow chart of a method for accessing a cell according to an embodiment.

In existing techniques, when a UE in a connected state is indicated to enter an idle state, a base station sends a certain identification to the UE, called Resume ID. Both the UE and a network save context information in the current connected state. When the UE is accessed to the network again, the UE initiates a connection resume procedure to indicate its Resume ID to the base station. The base station identifies the UE according to the Resume ID, and resumes a service tunnel (including GTP tunnel at interface S1 and data radio bearer at a corresponding air interface) established for the UE formerly using the saved context information of the UE.

In this way, the UE can perform data transmission through the service tunnel again. In the above procedure, there is no need to configure radio resources repeatedly, which greatly reduces signaling overhead.

To support the resume mechanism, both the base station and the MME need to save the context information of the UE, and the context information saved by the base station is not entirely same as that saved by the MME. When the UE is to access the network again, the UE needs to access a cell supporting the resume function, and the base station where the cell is located needs to be connected with the MME supporting the connection resume function. However, in the existing resume mechanism, the UE doesn't know whether the accessed cell supports the connection resume function, and the base station doesn't know whether the connected MME supports the connection resume function as well. Therefore, when initiating a connection resume procedure, the UE may probably initiate the procedure to a cell that does not support the connection resume function, which may cause failure in the connection resume procedure. Accordingly, the base station may not execute the connection resume procedure successfully as it doesn't know whether the connected MME supports the connection resume function.

In embodiments of the present disclosure, the base station informs the UE which cells support the connection resume function through the system information, and determines whether the MME supports the connection resume function. The UE starts to perform the connection resume procedure after knowing that the cell supports the connection resume function. The base station transmits the context information activation request to the MME to inform the MME to activate the saved context information, after making sure that the MME supports the connection resume function. Therefore, the UE initiates the connection resume procedure at the cell supporting the connection resume procedure, and the base station transmits the context information activation request to the MME supporting the connection resume function, which may avoid failure in the connection resume procedure.

In order to clarify the object, solutions and advantages of embodiments of the present disclosure, embodiments of present disclosure will be described clearly in detail in conjunction with accompanying drawings.

In an embodiment, a method for accessing a cell is provided. Referring to FIG. 1, the method is described in detail below.

First, a connection resume procedure is described briefly. In some embodiments, a UE saves context information, a base station saves the context information of the UE, and the MME saves the context information of the UE as well.

The context information saved by the UE includes security algorithm (including security key), configuration parameters for a medium access control layer, configuration parameters for a physical layer, configuration parameters for a radio link control layer and configuration parameters for a non-access layer. The context information of the UE saved by the base station mainly includes the configuration parameters for an access layer. The context information of the UE saved by the MME mainly includes the configuration parameters for the non-access layer and information of a GTP tunnel corresponding to a data radio bearer.

The UE accesses a cell administered by the base station and is in a connected state to perform service interaction with the base station. When the base station determines to change the UE from the connected state to an idle state, the base station saves the context information of the UE, and transmits an RRC connection suspend instruction and a resume identification to the UE. After receiving the RRC connection suspend instruction, the UE saves the context information configured by the base station when it accesses the network and the resume identification. Besides, the base station transmits a context information deactivation request to the MME to indicate the MME to save the context information of the UE.

In this way, the UE, the base station and the MME save the context information of the UE. After receiving the RRC connection suspend instruction and the resume identification, the UE is no longer in the connected state and enters a special idle state which is different from a common idle state. As the UE has saved the context information in the last connected state, the UE can perform cell selection using an existing cell selection and reselection mechanism or a strengthened cell selection and reselection mechanism in the special idle state. In embodiments below, a strengthened cell reselection mechanism is described, and both the special idle state and the common idle state are called an idle state.

In S101, system information is transmitted to a UE.

In some embodiments, when the UE is in an idle state, the UE may perform cell selection or cell reselection during which process system information may be received from a cell administered by a base station. The system information may include information indicating whether the cell supports a connection resume function. Therefore, based on the system information, the UE can know whether the cell transmitting the system information supports the connection resume function.

In some embodiments, a new cell may be added in the system information when the cell transmits the system information. The new cell may be an indication information element which is used for indicating whether the cell supports the connection resume function.

In some embodiments, the indication information element may be a one-bit cell. When it is 1, it indicates that the cell supports the connection resume function; and when it is 0, it indicates that the cell does not support the connection resume function.

In some embodiments, indication information elements may be set to have different bits according to different PLMN identifications. A plurality of indication information elements which have different bits may correspond to different PLMN identifications, respectively. In this situation, the cell is shared by the network, and the system information of the cell indicates a plurality of PLMN identifications.

For example, the PLMN identification for China Mobile is 46000, and the PLMN identification for China Unicom is 46001. The indication information element corresponding to the PLMN identification for China Mobile is set to be one-bit, the indication information element corresponding to the PLMN identification for China Unicom is also set to be one-bit, and the two indication information elements are located in different bits of the system information.

After accessing the cell administered by the base station, the UE acquires the indication information element which corresponds to a PLMN identification the UE has registered to determine whether the currently accessed cell supports the connection resume function. As the UE accesses the network and establishes services successfully formerly, it indicates that the UE has registered in the network, and the UE can acquire the PLMN identification. For example, assume that the indication information element corresponding to the PLMN identification for China Mobile being set to be 1 indicates that the connection resume function is supported, and being other values indicates that the connection resume function is not supported. When the PLMN identification the UE registered is 46000, if a value of the indication information element acquired by the UE is 1, the UE determines that the currently accessed cell supports the connection resume function.

Those skilled in the art can understand that, the different PLMN identifications of a shared cell may employ indication information elements with a same bit, which indicates that the different PLMN identifications have the same connection resume function.

In practice, when system information blocks are to be read, the UE always reads a system information block 1 (SIB1) first, and then reads other system information blocks (such as SIB2, SIB3 . . . ) following the system information block 1, successively.

If the indication information element is set in a particular system information block rather than SIB1 in a cell system information, the UE needs to read all the system information blocks before the particular system information block to know whether the cell supports the connection resume function. However, if the indication information element is set in SIB1, the UE only needs to read SIB1 to know whether the cell supports the connection resume function. If knowing that the cell does not support the connection resume function based on SIB1, the UE does not need to read any other system information blocks, so that power consumption of the UE may be reduced.

In some embodiments, when the UE performs cell selection or cell reselection in the idle state, if only one frequency is detected to meet a cell reselection criterion, a cell having the maximum signal strength value at the frequency is selected to camp on.

In some embodiments, when a plurality of frequencies meeting the cell reselection criterion are detected and each frequency has a cell having the maximum strength value measured by the UE, the UE can select one cell having the maximum strength value at each of the plurality of frequencies using existing measurement methods. The selected cell at each frequency is the strongest cell among all the cells at the frequency. Among the cells having the maximum strength value at the plurality of frequencies, the UE may select one cell supporting the connection resume function to camp on. That is to say, if a plurality of strongest cells at different frequencies are detected and meet the cell reselection criterion, the UE preferentially selects a cell supporting the connection resume function.

For example, there are three frequencies meeting the cell reselection criterion, including f1, f2 and f3. Cell 1, Cell 2 and Cell 3 are cells which have the maximum signal strength values at the frequencies f1, f2 and f3, respectively. Among the three cells, Cell 1 has the maximum signal strength value and does not support the connection resume function, Cell 2 has the second greatest signal strength value and does not support the connection resume function, Cell 3 has the minimum signal strength value and supports the connection resume function, and all the three cells meet the cell reselection criterion (i.e., S criterion in the standard TS36.304). In this situation, the UE may select Cell 3 at the frequency f3 to camp on.

In some embodiments, when a plurality of frequencies meeting the cell reselection criterion are detected, and at least two cells among the cells having the maximum strength values at the plurality of frequencies support the connection resume function, the UE may select one of the at least two cells randomly, or select one cell having a highest frequency priority among the at least two cells.

For example, there are three frequencies meeting the cell reselection criterion, including f1, f2 and f3. Cell 4, Cell 5 and Cell 6 are cells which have the maximum signal strength values at the frequencies f1, f2 and f3, respectively. Among the three cells, Cell 4 has the maximum signal strength value and does not support the connection resume function, Cell 5 has the second greatest signal strength value and supports the connection resume function, Cell 6 has the minimum signal strength value and supports the connection resume function, and all the three cells meet the cell reselection criterion (i.e., S criterion in the standard TS36.304). In this situation, the UE may select one of Cell 5 and Cell 6 randomly or based on frequency priorities of the frequencies f2 and f3 to camp on the selected cell.

In S102, after an RRC connection resume request is received from the UE, a resume identification of the UE is acquired from the RRC connection resume request.

In some embodiments, when the UE has service demand with the base station, the UE may initiate a random access procedure, during which an RRC connection resume request is transmitted to the base station. In some embodiments, a resume identification of the UE which has been saved by the UE may be contained in the RRC connection resume request. The resume identification of the UE was allocated by a base station which the UE accessed formerly.

When in the idle state, the UE may perform cell selection or cell reselection. After the cell selection or cell reselection, a base station corresponding to the cell the UE accesses may be same as that the UE accessed formerly, or different from that.

For example, the context information the UE saves currently was allocated by a first base station. After the cell selection or cell reselection, the base station corresponding to the cell the UE accesses is a second base station. The first base station and the second base station may be the same one or different ones.

After the cell reselection, the cell the UE accesses may be still one administered by the first station. During the random access procedure, the RRC connection resume request may carry the resume identification of the UE. Therefore, the first station can acquire the resume identification of the UE from the RRC connection resume request. Afterwards, S103 is performed.

In S103, context information of the UE is looked up based on the resume identification, and an RRC connection resume acknowledgement message is transmitted to the UE after the context information is found.

In some embodiments, the base station looks up the saved context information of the UE based on the resume identification, and transmits the RRC connection resume acknowledgement message to the UE after the context information is found. A connection resume procedure of an access layer is completed.

Afterwards, a connection resume procedure of a non-access layer is to be performed, which includes S104 to S106.

In S104, after it is determined that an MME supports the connection resume function, a context information activation request is transmitted to the MME.

In some embodiments, whether the MME supports the connection resume function is determined first. If the MME does not support the connection resume function, S104 is not performed, and subsequent steps are also not performed. That is, the connection resume procedure may not be performed successfully. If it is determined that the MME supports the connection resume function, the base station transmits the context information activation request to the MME. The context information activation request may include identification information of the UE, so that the MME can know which terminal the UE that performs the connection resume procedure is.

In some embodiments, the MME may transmit a message which includes information indicating that the MME supports the connection resume function to the base station. After receiving the message, the base station can determine that the MME supports the connection resume function. On the contrary, if not receiving any message including information indicating that the MME supports the connection resume function, the base station may determine that the MME does not support the connection resume function.

In some embodiments, during the setup of S1 interface by the base station and the MME, the MME may inform the base station that the MME supports the connection resume function through an S1 interface setup response message, that is, containing the information indicating that the MME supports the connection resume function in the S1 interface setup response message.

In some embodiments, the MME may inform the base station that the MME supports the connection resume function through an MME configuration update message, that is, containing the information indicating that the MME supports the connection resume function in the MME configuration update message. In practice, within a time period, the MME may not support the connection resume function, but after an update of the MME, the updated MME may support the connection resume function. The updated MME may transmit an MME configuration update message to the base station, so that the base station knows that the updated MME supports the connection resume function.

In some embodiments, when the base station determines to change the UE from the connected state to the idle state, and saves the context information of the UE, the base station transmits a context information deactivation message to the MME, to ask the MME to save the context information of the UE. In this way, when the UE executes the resume procedure, the MME can reuse the context information of the UE. After receiving the context information deactivation message, the MME feeds back to the base station a deactivation acknowledgement message if supporting the connection resume function, or a deactivation failure message which indicates that the MME doesn't support the connection resume function if not supporting the connection resume function. Accordingly, the base station determines that the MME supports the connection resume function if the deactivation acknowledgement message is received, or determines that the MME doesn't support the connection resume function if the deactivation failure message is received.

In S105, a context information activation acknowledgement message is received from the MME.

In some embodiments, as the MME supports the connection resume function, the MME has saved the context information of the UE. After receiving the context information activation request from the base station, the MME acquires the identification information of the UE from the context information activation request. Based on the identification information of the UE, the MME looks up the context information of the UE which has been saved. After finding the context information of the UE, the MME may transmit the context information activation acknowledgement message to the base station.

Reception of the context information activation acknowledgement message by the base station may indicate that the connection resume procedure of the non-access layer is finished.

In S106, a notification message is transmitted to the UE, wherein the notification message includes information indicating that a bearer is resumed.

After S101 to S105 are performed, the connection resume procedures of the access layer and the non-access layer are finished. A bearer between the UE and the base station, and a bearer between the base station and the MME are gotten through, and the UE can perform service interactions with the base station. In this situation, the base station may transmit a notification message to the UE, to inform the UE that the bearer is gotten through currently, that is, to transmit information indicating that the bearer is resumed.

In the existing techniques, a UE doesn't know whether a currently accessed cell supports a connection resume function, and a base station doesn't know whether a connected MME supports the connection resume function as well. After cell selection or cell reselection, the UE can initiate a connection resume procedure if it has saved the context information. However, the currently accessed cell may not support the connection resume function. Therefore, the connection resume procedure initiated by the UE may fail. Accordingly, the base station may not execute the connection resume procedure successfully as it doesn't know whether the connected MME supports the connection resume function.

In embodiments of the present disclosure, the base station informs the UE which cells support the connection resume function through the system information, and determines whether the MME supports the connection resume function. The UE starts to perform the connection resume procedure after knowing that the cell supports the connection resume function. The base station transmits the context information activation request to the MME to ask the MME to activate the saved context information, after making sure that the MME supports the connection resume function.

Therefore, it is ensured that the UE initiates the connection resume procedure at the cell supporting the connection resume procedure, and the base station transmits the context information activation request to the MME supporting the connection resume function, which may avoid failure in the connection resume procedure.

Figure 2:
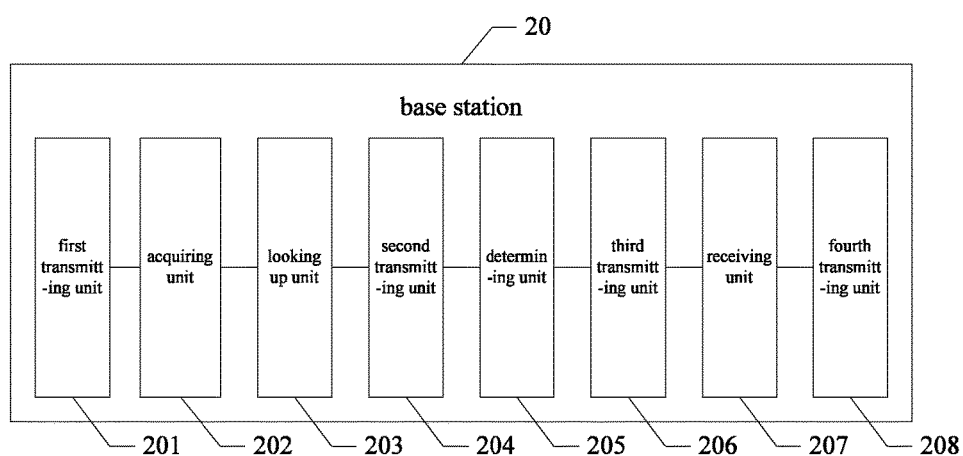
FIG. 2 schematically illustrates a structural diagram of a base station according to an embodiment.

Referring to FIG. 2, a base station 20 is provided in an embodiment, including a first transmitting unit 201, an acquiring unit 202, a looking up unit 203, a second transmitting unit 204, a determining unit 205, a third transmitting unit 206, a receiving unit 207 and a fourth transmitting unit 208.

The first transmitting unit 201 may be configured to transmit system information to a UE, wherein the system information includes information indicating whether the cell supports a connection resume function.

The acquiring unit 202 may be configured to acquire a resume identification of the UE from an RRC connection resume received from the UE.

The looking up unit 203 may be configured to look up context information of the UE based on the resume identification.

The second transmitting unit 204 may be configured to transmit an RRC connection resume acknowledgement message to the UE after the context information is found by the looking up unit 203.

The determining unit 205 may be configured to determine that an MME supports the connection resume function.

The third transmitting unit 206 may be configured to transmit a context information activation request to the MME, wherein the context information activation request includes identification information of the UE.

The receiving unit 207 may be configured to receive a context information activation acknowledgement message from the MME, wherein the context information activation acknowledgement message is transmitted after the MME finds the context information of the UE according to the identification information of the UE.

The fourth transmitting unit 208 may be configured to transmit a notification message to the UE, wherein the notification message includes information indicating that a bearer is resumed.

From above, the base station informs the UE which cells support the connection resume function through the system information, and determines whether the MME supports the connection resume function. The UE starts to perform the connection resume procedure after knowing that the cell supports the connection resume function. The base station transmits the context information activation request to the MME to inform the MME to activate the saved context information, after making sure that the MME supports the connection resume function. Therefore, the UE initiates the connection resume procedure at the cell supporting the connection resume procedure, and the base station transmits the context information activation request to the MME supporting the connection resume function, which may avoid failure in the connection resume procedure.

In some embodiments, the determining unit 205 may be configured to determine that a message which includes information indicating that the MME supports the connection resume function is received from the MME.

In some embodiments, the message which includes information indicating that the MME supports the connection resume function may be one of the following messages: S1 interface setup response message; an MME configuration update message; and a deactivation acknowledgement message fed back by the MME, wherein the deactivation acknowledgement message is generated after the MME receives a deactivation message.

In some embodiments, when the UE which has saved the resume identification performs cell reselection, if a plurality of cells are detected to have maximum signal strength values at different frequencies and meet a cell reselection criterion, a cell selected by the UE is the cell supporting the connection resume function.

Those skilled in the art can understand that all of or a portion of the processes in the method provided in the above embodiments can be implemented by related hardware with instruction of computer program. The computer program may be stored in a readable storage medium, and include the processes of the method provided in the above embodiments when it is executed. The readable storage medium may be a magnetic disk, an optical disk, a Read-Only Memory (ROM) or a Random Access Memory (RAM).

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for accessing a cell, comprising:

transmitting system information to a User Equipment (UE), wherein the system information comprises information indicating whether the cell supports a connection resume function;

after receiving a Radio Resource Control (RRC) connection resume request from the UE, acquiring a resume identification of the UE from the RRC connection resume request;

looking up context information of the UE based on the resume identification, and transmitting an RRC connection resume acknowledgement message to the UE after the context information is found;

after determining that a Mobility Management Entity (MME) supports the connection resume function, transmitting a context information activation request to the MME, wherein the context information activation request comprises identification information of the UE;

receiving a context information activation acknowledgement message from the MME, wherein the context information activation acknowledgement message is transmitted after the MME finds the context information of the UE according to the identification information of the UE; and transmitting a notification message to the UE, wherein the notification message comprises information indicating that a bearer is resumed.

2. The method according to claim 1, wherein determining that an MME supports the connection resume function comprises: determining that a message which comprises information indicating that the MME supports the connection resume function is received from the MME.

3. The method according to claim 2, wherein the message which comprises information indicating that the MME supports the connection resume function is one of the following messages: S1 interface setup response message; an MME configuration update message; and a deactivation acknowledgement message fed back by the MME, wherein the deactivation acknowledgement message is generated after the MME receives a deactivation message.

4. The method according to claim 1, wherein the system information comprises an indication information element which is used for indicating whether the cell supports the connection resume function.

5. The method according to claim 4, wherein the indication information element is set in a system information block 1.

6. The method according to claim 4, wherein there are a plurality of indication information elements which correspond to different Public Land Mobile Network (PLMN) identifications, respectively.

7. The method according to claim 5, wherein there are a plurality of indication information elements which correspond to different Public Land Mobile Network (PLMN) identifications, respectively.

8. The method according to claim 1, wherein when the UE which has saved the resume identification performs cell reselection, if a plurality of cells are detected to have maximum signal strength values at different frequencies and meet a cell reselection criterion, a cell selected by the UE is the cell supporting the connection resume function.

9. A base station, comprising:

a first transmitting unit, configured to transmit system information to a User Equipment (UE), wherein the system information comprises information indicating whether the cell supports a connection resume function;

an acquiring unit, configured to acquire a resume identification of the UE from an Radio Resource Control (RRC) connection resume received from the UE;

a looking up unit, configured to look up context information of the UE based on the resume identification;

a second transmitting unit, configured to transmit an RRC connection resume acknowledgement message to the UE after the context information is found by the looking up unit;

a determining unit, configured to determine that an Mobility Management Entity (MME) supports the connection resume function;

a third transmitting unit, configured to transmit a context information activation request to the MME, wherein the context information activation request comprises identification information of the UE;

a receiving unit, configured to receive a context information activation acknowledgement message from the MME, wherein the context information activation acknowledgement message is transmitted after the MME finds the context information of the UE according to the identification information of the UE; and a fourth transmitting unit, configured to transmit a notification message to the UE, wherein the notification message comprises information indicating that a bearer is resumed.

10. The base station according to claim 9, wherein the determining unit is configured to determine that a message which comprises information indicating that the MME supports the connection resume function is received from the MME.

11. The base station according to claim 10, wherein the message which comprises information indicating that the MME supports the connection resume function is one of the following messages: S1 interface setup response message; an MME configuration update message; and a deactivation acknowledgement message fed back by the MME, wherein the deactivation acknowledgement message is generated after the MME receives a deactivation message.

* * * * *